(12) United States Patent
Mongillo et al.

(10) Patent No.: US 10,801,334 B2
(45) Date of Patent: Oct. 13, 2020

(54) COOLING ARRANGEMENT WITH PURGE PARTITION

(71) Applicant: United Technologies Corporation, Farmington, CT (US)

(72) Inventors: Dominic J. Mongillo, West Hartford, CT (US); Timothy J. Jennings, West Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 327 days.

(21) Appl. No.: 16/129,070

(22) Filed: Sep. 12, 2018

(65) Prior Publication Data

US 2020/0080427 A1    Mar. 12, 2020

(51) Int. Cl.
*F01D 5/18* (2006.01)
*F01D 5/20* (2006.01)

(52) U.S. Cl.
CPC ............... *F01D 5/187* (2013.01); *F01D 5/20* (2013.01); *F05D 2250/185* (2013.01); *F05D 2260/20* (2013.01)

(58) Field of Classification Search
CPC . F01D 5/18; F01D 5/187; F01D 5/188; F01D 5/20
See application file for complete search history.

(56) References Cited

U.S. PATENT DOCUMENTS

| 4,411,597 A | * | 10/1983 | Koffel | ........................ F01D 5/20 416/224 |
| 5,902,093 A | | 5/1999 | Liotta et al. | |

(Continued)

FOREIGN PATENT DOCUMENTS

| DE | 19963375 | 7/2001 |
| EP | 1079072 | 2/2001 |

(Continued)

OTHER PUBLICATIONS

Extended European Search Report for Application No. EP 15 00 1485 dated Sep. 18, 2015.

(Continued)

*Primary Examiner* — Richard A Edgar
(74) *Attorney, Agent, or Firm* — Carlson, Gaskey & Olds, P.C.

(57) ABSTRACT

An airfoil includes an airfoil section that extends in a radial direction from a platform to a tip, and extends in a thickness direction between a pressure side and a suction side that meet together at both a leading edge and a trailing edge. A purge partition radially divides the airfoil section. A perimeter of the purge partition follows along external walls of the airfoil section. The tip defines a tip pocket that extends radially inwardly from the tip to a floor. The airfoil section includes at least one internal cooling circuit and a purge cavity opposed to the at least one internal cooling circuit along the purge partition, with the purge partition bounded by the floor. The purge partition defines a first set of apertures that fluidly couple the at least one internal cooling circuit and the purge partition. A method of cooling a gas turbine engine component is also disclosed.

22 Claims, 6 Drawing Sheets

(56) References Cited

U.S. PATENT DOCUMENTS

| | | | |
|---|---|---|---|
| 6,164,914 A * | 12/2000 | Correia | F01D 5/20 415/115 |
| 6,174,135 B1 * | 1/2001 | Lee | F01D 5/20 416/97 R |
| 7,537,431 B1 | 5/2009 | Liang | |
| 7,695,248 B2 * | 4/2010 | Mons | F01D 5/20 416/97 R |
| 8,011,889 B1 | 9/2011 | Liang | |
| 8,435,004 B1 | 5/2013 | Liang | |
| 8,512,003 B2 | 8/2013 | Klasing et al. | |
| 8,647,071 B2 | 2/2014 | Pons et al. | |
| 8,738,491 B1 | 5/2014 | Pettay | |
| 9,938,837 B2 | 4/2018 | Levine et al. | |
| 2003/0021684 A1 | 1/2003 | Downs et al. | |
| 2008/0044289 A1 | 2/2008 | Klasing et al. | |
| 2010/0111704 A1 | 5/2010 | Hada | |
| 2012/0076653 A1 | 3/2012 | Beeck et al. | |
| 2013/0266454 A1 | 10/2013 | Mongillo, Jr. et al. | |
| 2014/0030101 A1 | 1/2014 | Mishra et al. | |
| 2014/0030102 A1 | 1/2014 | Mishra et al. | |
| 2014/0047842 A1 | 2/2014 | Chius et al. | |
| 2014/0099139 A1 | 4/2014 | Kojima | |
| 2015/0159488 A1 | 6/2015 | Lehmann et al. | |
| 2017/0370232 A1 | 12/2017 | Lee | |

FOREIGN PATENT DOCUMENTS

| | | |
|---|---|---|
| EP | 1557533 | 7/2005 |
| EP | 2426316 | 3/2012 |
| EP | 2666967 | 11/2013 |
| EP | 2666968 | 11/2013 |
| EP | 2746536 | 6/2014 |
| WO | 2010/010284 | 1/2010 |
| WO | 2015/069411 | 5/2015 |

OTHER PUBLICATIONS

European Search Report for European Patent Application No. 19196782.7 completed Jan. 15, 2020.

\* cited by examiner

COOLING ARRANGEMENT WITH PURGE PARTITION

BACKGROUND

This disclosure relates to cooling for a component of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each.

SUMMARY

An airfoil for a gas turbine engine according to an example of the present disclosure includes an airfoil section that extends in a radial direction from a platform to a tip, and extends in a thickness direction between a pressure side and a suction side that meet together at both a leading edge and a trailing edge. The tip defines a tip pocket that extends inwardly from the tip to a floor. The airfoil section includes a purge partition that extends in a chordwise direction between the leading and trailing edges and extends in the thickness direction between the pressure and suction sides to divide the airfoil section into a first region and a second region. The first region defines at least one internal cooling circuit. The second region defines a purge cavity. The purge partition defines a first set of apertures that fluidly couple the at least one internal cooling circuit and the purge cavity, and the purge cavity extends along the floor between the leading and trailing edges.

In a further embodiment of any of the foregoing embodiments, the at least one internal cooling circuit extends between the leading and trailing edges.

In a further embodiment of any of the foregoing embodiments, the airfoil section extends in the radial direction between 0% span at the platform and 100% span at the tip, and the purge partition is defined at a radial position between 75% and 98% span.

In a further embodiment of any of the foregoing embodiments, the airfoil section defines a second set of apertures in the floor that fluidly couple the purge cavity and the tip pocket, the airfoil section defines a purge slot along an external wall that bounds the purge cavity. A total cross-sectional area of all of the second set of apertures is greater than a combined sum, the combined sum defined as a total cross-sectional area of all of the first set of apertures and a cross-sectional area of the purge slot, and the cross-sectional area of the purge slot is greater than the cross-sectional area of each of the first set of apertures.

In a further embodiment of any of the foregoing embodiments, the airfoil section includes a rim wall feature that follows a perimeter of the airfoil section along the tip to bound the tip pocket.

In a further embodiment of any of the foregoing embodiments, the airfoil section defines a purge slot along an external wall that bounds the purge cavity.

In a further embodiment of any of the foregoing embodiments, the purge slot is defined adjacent to the trailing edge.

In a further embodiment of any of the foregoing embodiments, a cross-sectional area of the purge slot is greater than a cross-sectional area of each of the first set of apertures.

In a further embodiment of any of the foregoing embodiments, the airfoil section includes a plurality of ribs arranged to define a serpentine flow path in the at least one internal cooling circuit.

In a further embodiment of any of the foregoing embodiments, an external wall of the airfoil section defines a plurality of film cooling holes extending from the purge cavity.

In a further embodiment of any of the foregoing embodiments, the airfoil is a turbine blade.

A gas turbine engine according to an example of the present disclosure includes an array of blades rotatable about an engine axis, and an array of blade outer air seals (BOAS) arranged about the array of blades to bound a gas path. At least one of the array of blades includes an airfoil section that extends in a radial direction from a platform to a tip, and extends in a thickness direction between a pressure side and a suction side that meet together at both a leading edge and a trailing edge. A purge partition radially divides the airfoil section. A perimeter of the purge partition follows along external walls of the airfoil section. The tip defines a tip pocket that extends radially inwardly from the tip to a floor. The airfoil section includes at least one internal cooling circuit and a purge cavity opposed to the at least one internal cooling circuit along the purge partition, with the purge partition bounded by the floor. The purge partition defines a first set of apertures that fluidly couple the at least one internal cooling circuit and the purge partition.

In a further embodiment of any of the foregoing embodiments, the purge partition extends in the thickness direction between the pressure side and the suction side.

In a further embodiment of any of the foregoing embodiments, the floor defines a second set of apertures that fluidly couple the purge cavity and the tip pocket.

In a further embodiment of any of the foregoing embodiments, each of the second set of apertures defines a passage axis oriented to eject flow into a clearance gap defined in the radial direction between the tip and an adjacent one of the BOAS.

A further embodiment of any of the foregoing embodiments includes a turbine section driving a compressor section. The airfoil is a turbine blade of the turbine section.

A method of cooling a gas turbine engine component according to an example of the present disclosure includes communicating cooling flow to an internal cooling circuit of an airfoil section. A purge partition radially divides the airfoil section. The airfoil section defines a purge cavity opposed to the internal cooling circuit along the purge partition. The method includes communicating the cooling flow through a first set of apertures in the purge partition and then to the purge cavity to purge debris in the internal cooling circuit, and communicating a portion of the cooling flow from the purge cavity to a second set of apertures defined along a floor of a tip pocket. The tip pocket extends inwardly from a tip of the airfoil section and ejects the portion of the cooling flow from the second set of apertures to a clearance gap defined between the tip and a blade outer air seal (BOAS).

In a further embodiment of any of the foregoing embodiments, the gas turbine engine component is a turbine blade, and the airfoil section extends radially from a platform to the tip.

In a further embodiment of any of the foregoing embodiments, the tip pocket is bounded by a rim wall feature that follows a perimeter of the airfoil section along a tip portion to define the tip, and the method further includes contacting the rim wall feature with the BOAS in response to rotating the airfoil section.

A further embodiment of any of the foregoing embodiments includes removing the tip portion that has walls of the airfoil section bounding the purge cavity, and attaching a second tip portion to a remainder of the airfoil section to define another instance of the purge cavity and another instance of the tip pocket.

The various features and advantages of this invention will become apparent to those skilled in the art from the following detailed description of an embodiment. The drawings that accompany the detailed description can be briefly described as follows.

DETAILED DESCRIPTION

Figure 1:
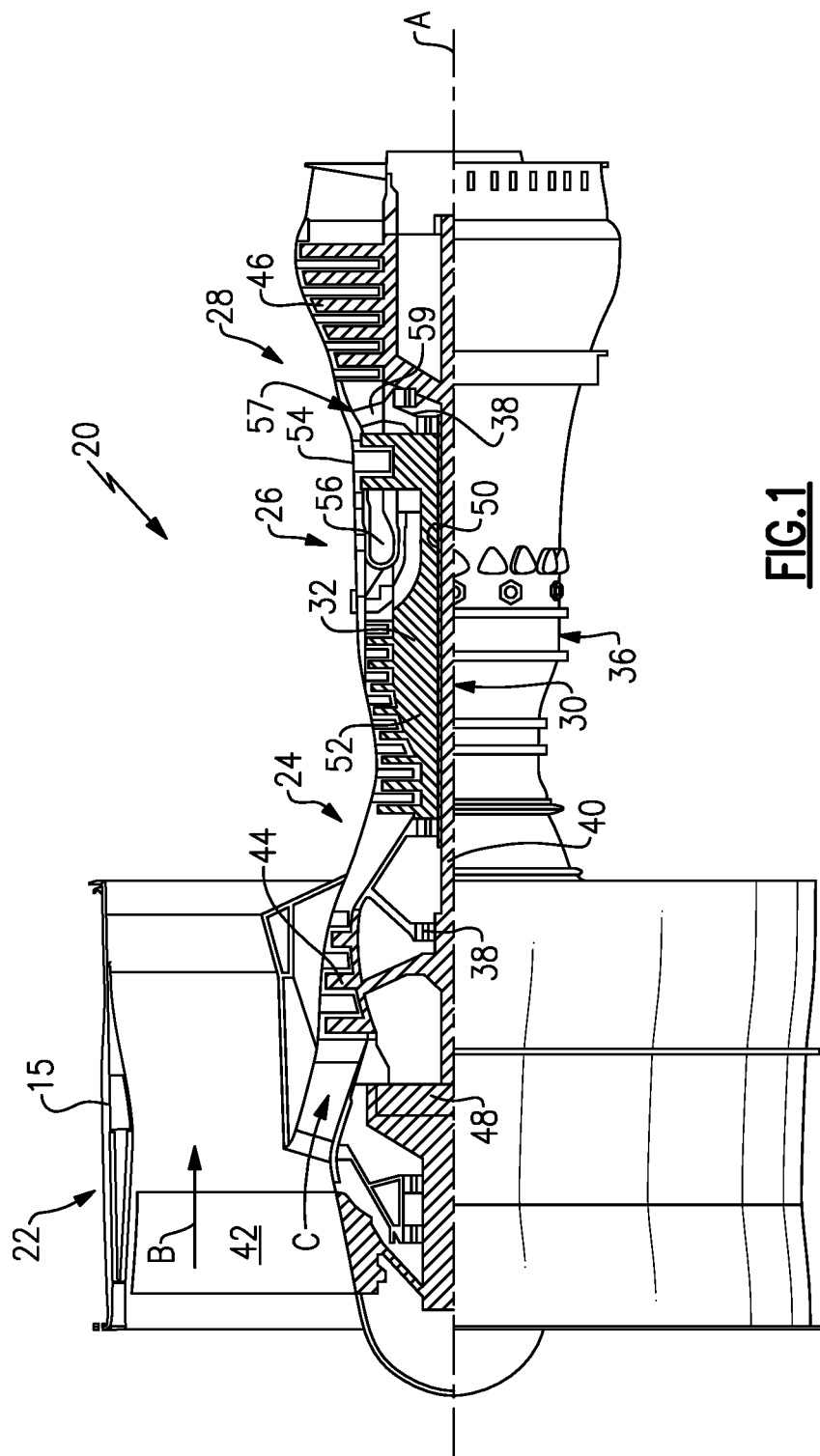
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption —also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
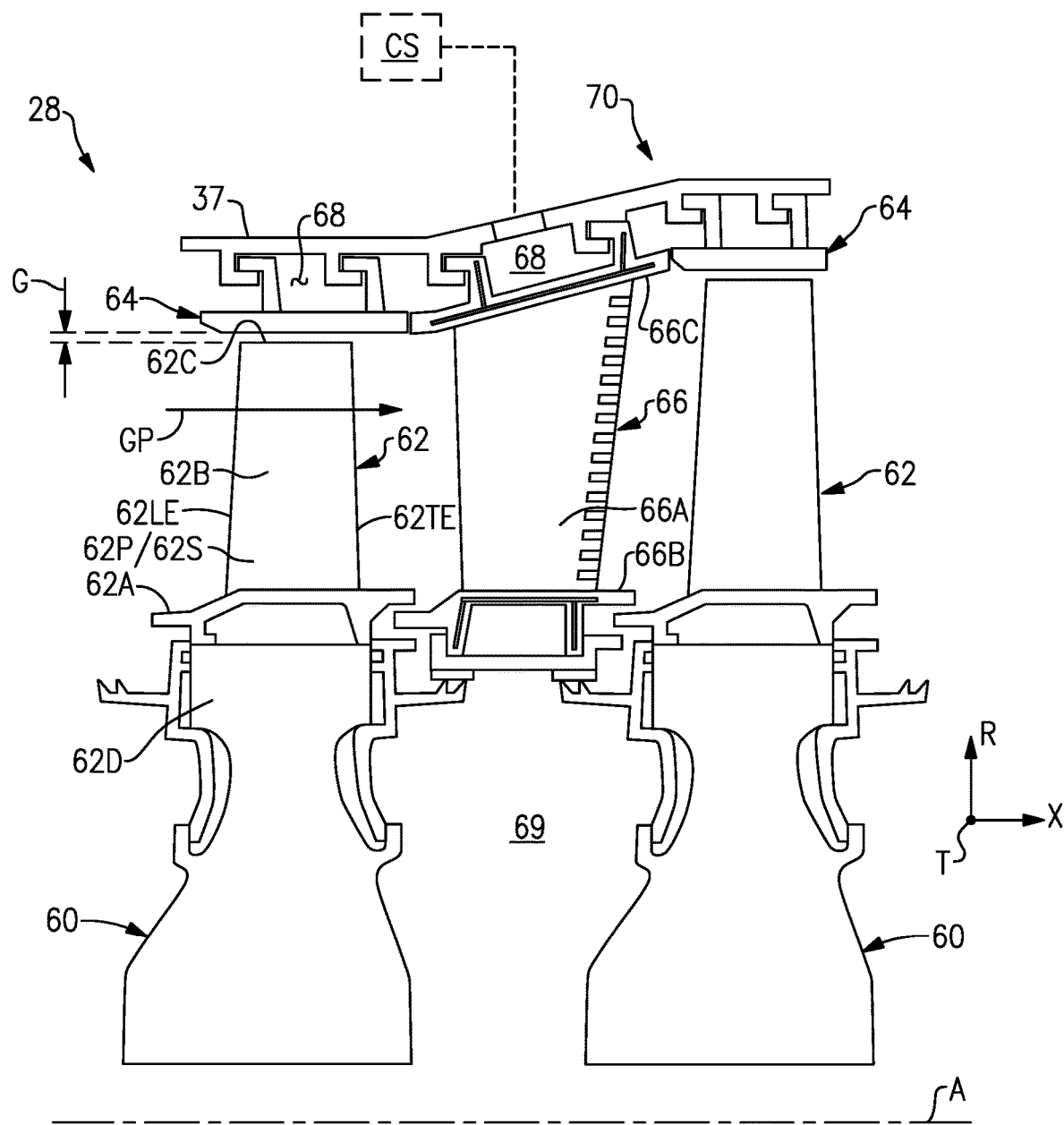
FIG. 2 schematically shows an airfoil arrangement for a turbine section.

FIG. 2 shows selected portions of the turbine section 28 including a rotor 60 carrying one or more blades or airfoils 62 that are rotatable about the engine axis A in a gas path. In this disclosure, like reference numerals designate like elements where appropriate and reference numerals with the addition of one-hundred or multiples thereof designate modified elements that are understood to incorporate the same features and benefits of the corresponding original elements. Each airfoil 62 includes a platform 62A and an airfoil section 62B extending in a spanwise or radial direction R from the platform 62A to a tip 62C. The airfoil section 62B generally extends in a chordwise or axial direction X between a leading edge 62LE and a trailing edge 62TE. The airfoil section 62B extends in a circumferential or thickness direction T between pressure and suction sides 62P, 62S that meet together at both the leading edge 62TE and the trailing edge 62TE. A root section 62D of the airfoil 62 is mounted to, or integrally formed with, the rotor 60. A blade outer air seal (BOAS) 64 is spaced radially outward from the tip 62C of the airfoil section 62B. The BOAS 64 can include a plurality of seal arc segments that are circumferentially arranged in an annulus around the engine axis A. An array of the BOAS 64 are distributed or arranged about an array of the airfoils 62 to bound a gas path GP, such as the core flow path C of FIG. 1. The tips 62C of each of the airfoils 62 and adjacent BOAS 64 are arranged in close radial proximity to reduce the amount of gas flow that escapes around the tips 62C through a corresponding clearance gap G. The clearance gap G extends in the radial direction R between the adjacent airfoils 62 and BOAS 64.

A vane 66 is positioned along the engine axis A and adjacent to the airfoil 62. The vane 66 is spaced axially from the adjacent airfoil 62. The vane 66 includes an airfoil section 66A extending between an inner platform 66B and an outer platform 66C to define a portion of the core flow path C. The turbine section 28 includes an array of airfoils 62, BOAS 64, and vanes 66 arranged circumferentially about the engine axis A.

The turbine section 28 includes a cooling arrangement 70. The cooling arrangement 70 includes one or more cooling cavities or plenums 68, 69 defined by an engine static structure such as the engine case 37 or another portion of the engine static structure 36 (FIG. 1). One or more cooling sources CS (one shown) are configured to provide cooling air to the plenums 68, 69. The plenums 68, 69 are configured to receive pressurized cooling flow from the cooling source (s) CS to cool portions of the airfoil 62, BOAS 64 and/or vane 66. Cooling sources CS can include bleed air from an upstream stage of the compressor section 24 (FIG. 1), bypass air, or a secondary cooling system aboard the aircraft, for example. Each of the plenums 68, 69 can extend in a circumferential or thickness direction T between adjacent airfoils 62, BOAS 64 and/or vanes 66.

Figure 3:
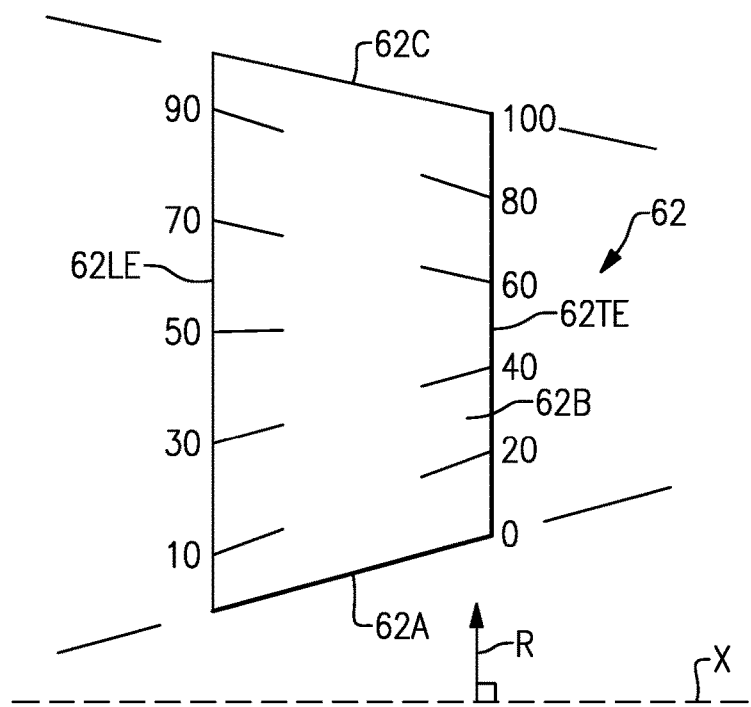
FIG. 3 is a schematic view of airfoil span positions.

Referring to FIG. 3, span positions are schematically illustrated from 0% to 100% in 10% increments. Each section at a given span position is provided by a conical cut that corresponds to the shape of the gas path, as shown by the large dashed lines. In the case of an airfoil 62 with an integral platform, the 0% span position corresponds to the radially innermost location where the airfoil section 62B meets the fillet joining the airfoil section 62B to the platform 62A. In the case of an airfoil 62 without an integral platform, the 0% span position corresponds to the radially innermost location where the discrete platform 62A meets the exterior surface of the airfoil section 62B. The 100% span position corresponds to a radially outermost location of the airfoil 62 along the tip 62C.

Figure 6:
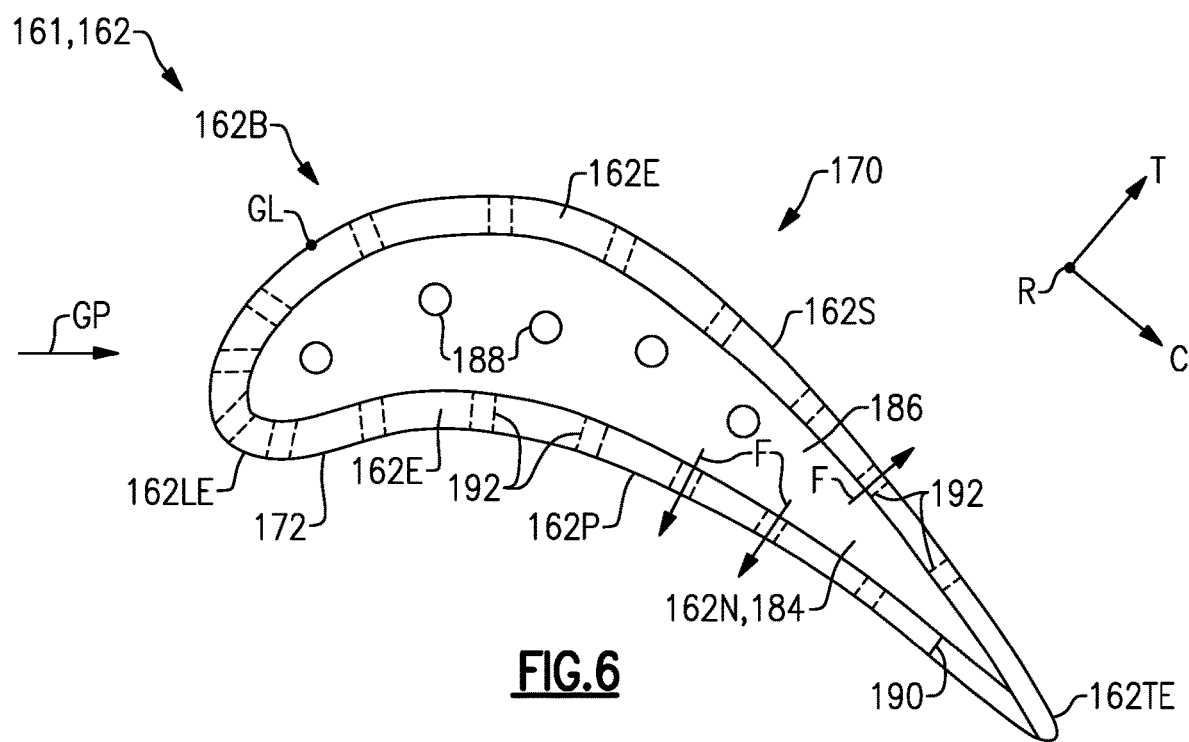
FIG. 6 is a sectional view of the component taken along line 6-6 of FIG. 5.
Figure 4:
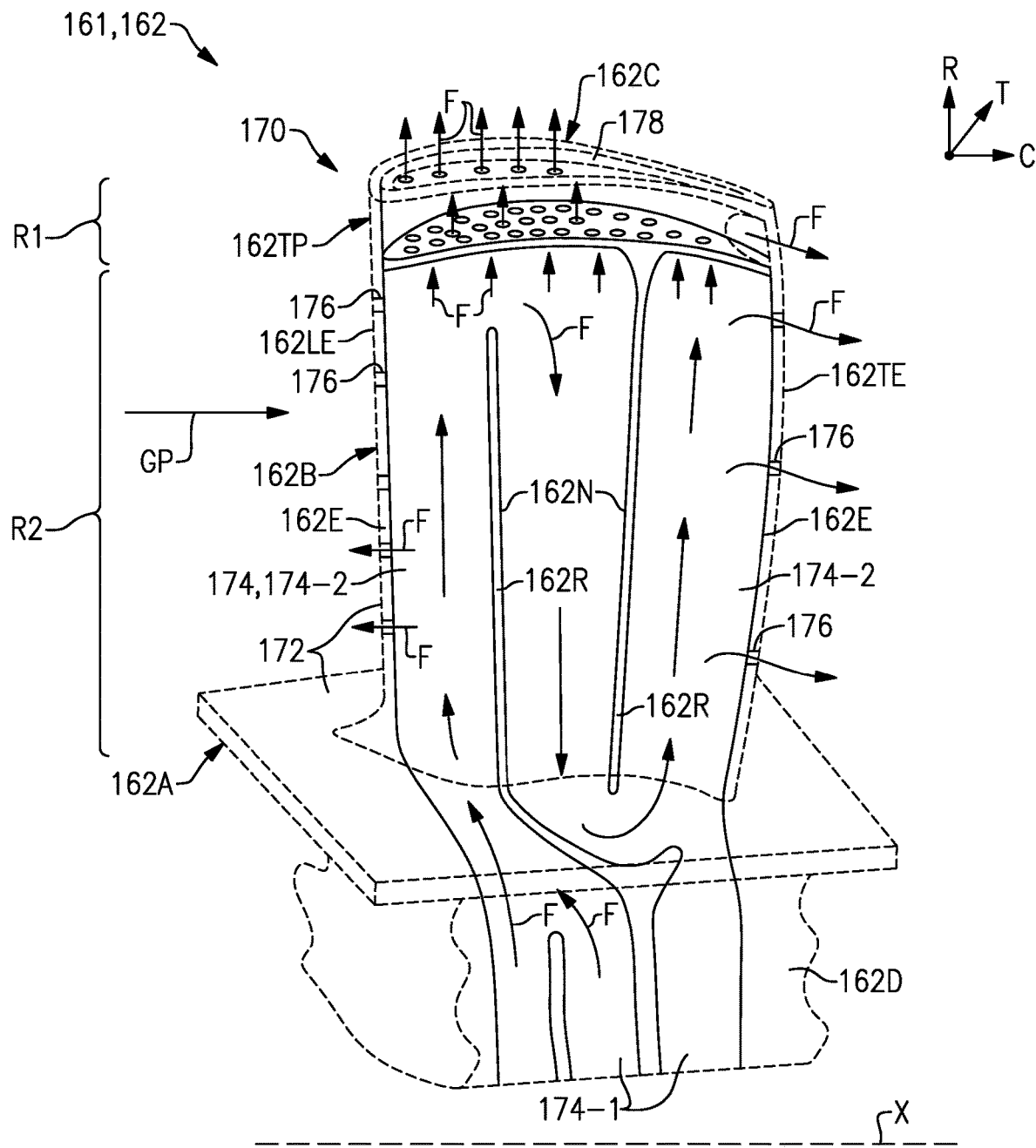
FIG. 4 illustrates a perspective view of a gas turbine engine component.
Figure 5:
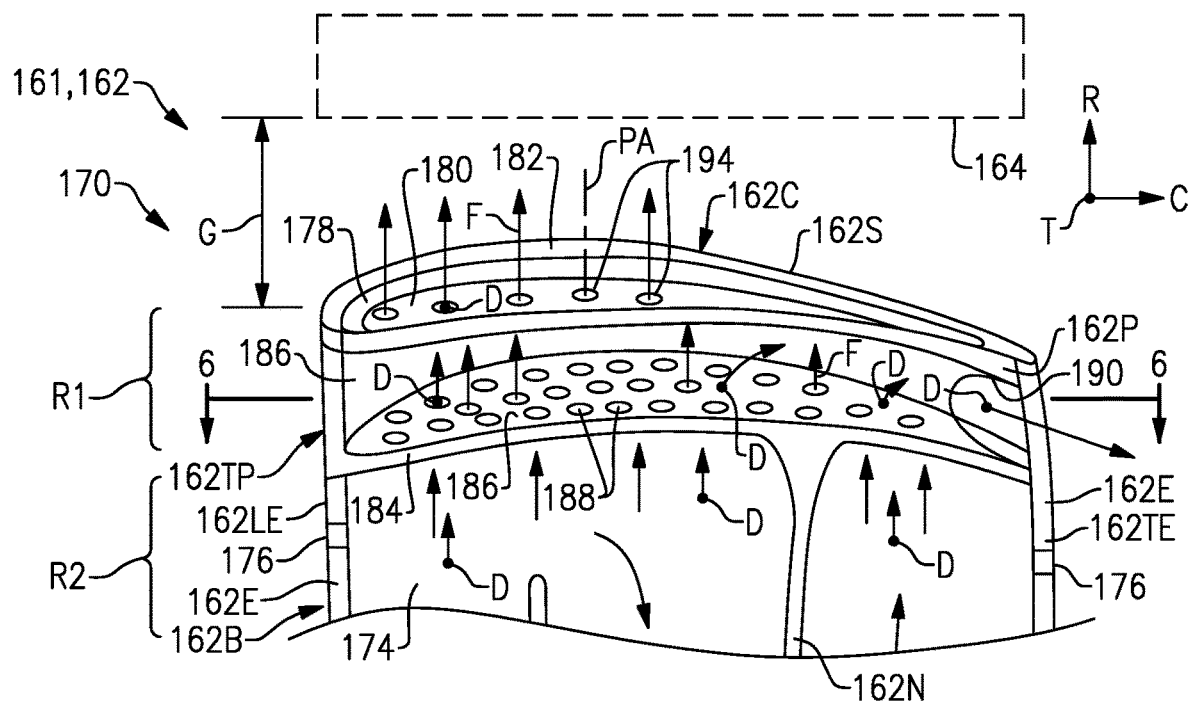
FIG. 5 illustrates portions of the component of FIG. 4.

FIGS. 4-6 illustrate an exemplary gas turbine engine component 161 defining a cooling arrangement 170. The gas turbine engine component 161 can be incorporated into the engine 20 of FIG. 1, for example. In the illustrated example of FIGS. 4-6, the gas turbine engine component 161 is a blade or airfoil 162. In examples, the airfoil 162 is a turbine blade that can be incorporated into turbine section 28 of FIG. 1 or 2, for example. Although the disclosure primarily refers to the component 161 being a blade or airfoil, other components can benefit from the teachings herein, including vanes, BOAS, combustor panels and liners, and other systems including land based power and industrial turbines.

Referring to FIG. 4, external walls of the airfoil 162 are shown in phantom for illustrative purposes. The airfoil 162 includes a platform 162A and an airfoil section 162B that extends radially outward from the platform 162A to terminate at an airfoil tip 162C. The airfoil 162 includes one or more internal walls 162N defined within a thickness of the airfoil 162 and external walls 162E. Surfaces along the external walls 162E of the platform 162A and airfoil section 162B establish an external surface contour 172 that interacts with gases in gas path GP (FIG. 2) during operation of the engine.

The airfoil 162 defines a cooling arrangement 170 for transporting cooling air flow F through portions of the airfoil 162. The cooling arrangement 170 includes at least one internal cooling cavity or circuit 174 in a thickness of the airfoil 162. The cooling circuit 174 can include one or more portions defined at various locations of the airfoil 162 and at various orientations. In the illustrated example of FIG. 4, the cooling circuit 174 includes one or more feeding cavities 174-1 that extend through root section 162D for receiving cooling flow F from the coolant source CS (FIG. 2).

The cooling circuit 174 includes one or more segments or cooling passages 174-2 that extend through the airfoil section 162B for cooling portions of the airfoil 162. The cooling passages 174-2 can be interconnected to circulate the cooling flow F in the airfoil section 162B. For example, the airfoil 162 can include a plurality of ribs 162R defined by the internal walls 162N that are arranged to define a multi-pass serpentine flow path in the cooling circuit 174. The internal cooling circuit 174 extends between the leading edge 162LE and the trailing edge 162TE. The airfoil 162 can define one or more apertures 176 for ejecting cooling flow F from the cooling circuit 174 to provide convective and/or film cooling to adjacent portions of the airfoil 162. The apertures 176 can be defined adjacent the leading and/or trailing edges 162LE, 162TE, for example.

Referring to FIG. 5, with continued reference to FIG. 4, cooling arrangement 170 includes a tip pocket 178 defined by the tip 162C. The airfoil section 162B includes a rim wall feature 182 that follows a perimeter of the airfoil section 162B along the tip 162C to bound the tip pocket 178. The rim wall feature 182 defines a portion of the external surface contour 172.

The tip pocket 178 extends predominately radially inwardly from the tip 162C to a floor 180, which forms the outer tip wall, such that the tip pocket 178 is exposed to the gas path GP along the tip 162C. The squealer pocket and/or tip floor 180 is a wall 162E of the airfoil 162 that extends in the chord-wise and thickness directions C, T. The arrangement of the tip pocket 178 and rim wall feature 182 may be referred to as a "tip squealer" arrangement. In other examples, the tip pocket 178 is omitted such that the tip 162C is relatively planar and flush and of equivalent radial height between the leading and trailing edges 162LE, 162TE and the pressure and suction sides 162P, 162S.

During operation, dirt or sand particles and other debris may be communicated in the internal cooling circuit 174. The debris may deposit or collect on internal surfaces of the internal cooling circuit 174, which may block or otherwise impede flow of the cooling flow F through portions of the cooling arrangement 170. Accumulation of debris can act as an insulator which reduces the thermal cooling effectiveness and convective cooling of adjacent portions of the airfoil 162. Reductions in local thermal cooling effectiveness due to dirt particulate accumulation may cause increases in the floor 180 wall metal temperatures, and in local airfoil tip 162C thermal strains, resulting in premature and accelerated durability failure modes related to local airfoil tip 162C oxidation, and thermal mechanical fatigue (TMF) cracking in the airfoil 162. Thru wall oxidation and TMF cracking in the airfoil tip 162C, may adversely impact the functional thermal cooling performance associated with the internal convective heat transfer augmentation and film cooling characteristics which would have otherwise been provided by a non-compromised internal cooling circuit 174. The redirecting of cooling air flow F, thru local distressed regions of the airfoil tip 162C, reduces the overall cooling efficiency and durability capability of the airfoil 162. Accumulation of debris can also cause an increase in turbine temperature and an increase in the clearance gap G, which can reduce efficiency of the airfoil 162, as well as stage and engine performance.

Again with reference to FIG. 5, the cooling arrangement 170 includes one or more features such as apertures 188 to purge debris from the internal cooling circuit 174. The airfoil section 162B includes a purge partition 184 which defines an internal wall 162N of the airfoil 162. The purge partition 184 extends in the chordwise direction C between the leading and trailing edges 162LE, 162TE and extends in the thickness direction T between the pressure and suction sides 162P, 162S to radially divide the airfoil section 162B into a first region R1 and a second region R2. The first and second regions R1, R2 are radially spaced with respect to the radial direction R. The first region R1 extends radially outward of the purge partition 184 and includes tip portion 162TP. The second region R2 extends radially inward of the purge partition 184. The first region R1 defines each and every cooling flow path radially outward of the purge partition 184, whereas the second region R2 defines each and every cooling flow path or cavity radially inward of the purge partition 184.

In the illustrated example of FIGS. 4-6, a perimeter of the purge partition 184 follows along the external walls 162E of the airfoil section 162B to separate the first and second regions R1, R2. The purge partition 184 can be substantially planar, conical, and/or comprise of convex/concave surface shapes in order to control the orientation and directionality of the air flow F as it is transported through the apertures 188, thereby improving the purge characteristics of debris particulate within the internal cooling circuit 174. For the purposes of this disclosure, the term "substantially" means a deviation of no more than ±5% unless otherwise disclosed. The purge partition 184 is radially spaced apart from the floor 180. The purge partition 184 and the squealer pocket and/or tip floor 180 may be substantially parallel to each other. Alternatively, the purge partition 184 may be uniquely shaped in order to locally tailor the radial distance relative to the squealer pocket and/or tip floor 180 to enhance backside convective heat transfer, as well as, improve the purge and expulsion of dirt particulate contained within the purge cavity 186.

In examples, the purge partition 184 is defined at a radial position between 75% and 98% span, or more narrowly at a radial position greater than or equal to 85% span, such that the first region R1 has a volume that is less than a volume of the second region R2. The radial position of the purge partition 184 can be defined with respect to one or more predetermined vibratory modes of the airfoil 162. In examples, the volume of the first region R1 is less than 25% of the volume of the second region R2, or more narrowly less than 5% or 10%. The volumes of the first and second regions R1, R2 are defined with respect to a spatial boundary of the airfoil section 162B.

The first region R1 defines cooling arrangement 170 to include a purge cavity 186 that is configured to receive cooling flow F and debris from the internal cooling circuit(s) 174. The purge cavity 186 extends between and is bounded in the radial direction R between the squealer pocket and/or tip floor 180 and the purge partition 184. The purge cavity 186 is opposed to the internal cooling circuit(s) 174 along the purge partition 184.

The purge cavity 186 extends along the floor 180 between the leading and trailing edges 162LE, 162TE. In the illustrated example of FIG. 5, the purge cavity 186 is spaced apart in the radial direction R from each and every cooling flow path or cavity defined in the second region R2 or that is otherwise defined radially inward of the purge partition 184. The arrangement of the purge cavity 186 can reduce centrifugal forces imposed on the airfoil 162 due to a reduction in mass adjacent the tip 162C.

The purge partition 184 defines a first set of apertures 188 spaced apart from the floor 180. The apertures 188 interconnect or otherwise fluidly couple the internal cooling circuit(s) 174 and the purge cavity 186. In examples, the apertures 188 provide the sole flow path between each and every cooling flow path or cavity defined in the second region R2, including internal cooling circuit(s) 174, and each and every cooling flow path or cavity defined in the first region R1, including the purge cavity 186 and tip pocket 178. Cooling flow F communicated from the apertures 188 can provide convective cooling to adjacent portions of the purge cavity 186. The apertures 188 can be oriented to eject cooling flow F to impinge on the backside surfaces, defined by the inboard radius of the squealer pocket and/or tip floor 180 bounding the purge cavity 186.

The airfoil section 162B can define one or more purge slots 190 (one shown for illustrative purposes) along an external wall 162E that bounds the purge cavity 186. In the illustrated example of FIGS. 3-5, the purge slot 190 is defined adjacent to the trailing edge 162TE of the airfoil section 162B. The purge slot 190 extends from the trailing edge 162TE along the pressure side 162P. In other examples, the purge slot 190 extends from the trailing edge 162TE along the suction side 162S. The purge slot 190 can be defined along another portion of the purge cavity 186, such as at a location spaced apart from the trailing edge 162TE along the pressure or suction sides 162P, 162S.

The purge slot 190 can be dimensioned relative to the apertures 188 to establish a predetermined pressure in the purge cavity 186 and across the purge slot 190. In examples, a cross-sectional area of the purge slot 190 is greater than a cross-sectional area of each of the individual apertures 188. The purge slot 190 can be dimensioned to provide a low pressure sink for relatively fine dirt/sand particulate or debris D to evacuate the purge cavity 186. In examples, the cross-sectional area of each of the individual apertures 188 taken along the purge cavity 186 is less than 5%, or more narrowly less than 3%, of the total cross-sectional area of the purge partition 184 taken along the purge cavity 186.

One or more of the external walls 162E of the airfoil section 162B can define one or more film cooling holes 192 (shown in dashed lines in FIG. 6) extending from the purge cavity 186. The film cooling holes 192 are configured to eject cooling flow F outwardly of the purge cavity 186 to provide film cooling to external surfaces of the airfoil section 162B. The cooling holes 192 can reduce locally high external heat flux and can provide conductive and film cooling to adjacent portions of the airfoil 162. In some examples, the suction side 162S of the airfoil section 162B along the purge cavity 186 is free of any cooling holes 192 downstream of a geometric and aerodynamic gage location GL to reduce relatively high momentum mixing losses otherwise caused by ejecting film cooling airflow which can adversely impact aerodynamic performance. The gage location GL is defined at a position along the suction side 162S between the leading and trailing edges 162LE, 162TE. The location in FIG. 6 of the gage location GL is shown for illustrative purposes and may vary with respect to a particular geometry of the airfoil 162.

The airfoil section 162B defines a second set of apertures 194 in the squealer pocket and/or tip floor 180. The apertures 194 interconnect or otherwise fluidly couple the purge cavity 186 and the tip pocket 178. Each of the apertures 194 defines a passage axis PA. The passage axis PA is oriented to eject cooling flow F into clearance gap G defined in the radial direction R between the airfoil tip 162C and adjacent Blade Outer Air Seal (BOAS) 164 (shown schematically in dashed lines in FIG. 5 for illustrative purposes). The apertures 188, 194 can be sized to be relatively larger than an expected size of dirt/sand particles and other debris D that may be communicated in the internal cooling circuit(s) 174 and to establish a predetermined velocity of the cooling flow F. The apertures 188 can be sized with respect to a predetermined pressure loss across the purge partition 184. The apertures 188, 194 and purge slot 190 can be dimensioned to establish a predetermined cavity pressure in the purge cavity 186. In examples, the total cross-sectional area of all of the apertures 194 is greater than the combined sum, where the combined sum is defined as the total cross-sectional area of all of the apertures 188 and the cross-sectional area of the purge slot 190. In an alternative embodiment, the total cross-sectional area of all the apertures 194 is equal to, or less than, the combined sum of the total cross-sectional area of the apertures 188 and the cross-sectional area of the purge slot 190.

Continuing reference to FIG. 5, during operation of the engine cooling flow F is communicated to the internal cooling circuit(s) 174. A portion of the cooling flow F is communicated through the first set of apertures 188 in the purge partition 184 and then to the purge cavity 186. A portion of the cooling flow F from the purge cavity 186 is communicated to the purge cavity 186 and the second set of apertures 194. A portion of the cooling flow F from the purge cavity is ejected from the apertures 194 to the clearance gap G.

The cooling flow F carries, transports or otherwise moves the debris D towards the purge cavity 186 and/or second set of apertures 194. The debris D is ejected outwardly through the purge slot 190 and/or apertures 194 and into the gas path GP (FIG. 4) to purge debris D in the internal cooling circuit(s) 174 and purge cavity 186. The apertures 188 reduce the likelihood of accumulation of debris D along an inner diameter of the purge partition 184 immediate adjacent to the internal cooling circuit(s) 174. The purge partition 184 and apertures 188 reduce a likelihood of oxidation in the various flow paths established by the internal cooling circuit(s) 174 that may otherwise occur due to blockage or obstruction caused by debris D.

During operation, the radial positions of the airfoil tip 162C and/or adjacent BOAS 164 (shown in dashed lines) can change to cause a dimension of the clearance gap G to vary. The rim wall feature 182 can rub against or otherwise directly contact an inner diameter of the BOAS 164 in response to rotating the airfoil 162 including airfoil section 162B about the axis X (FIG. 4).

Figure 7:
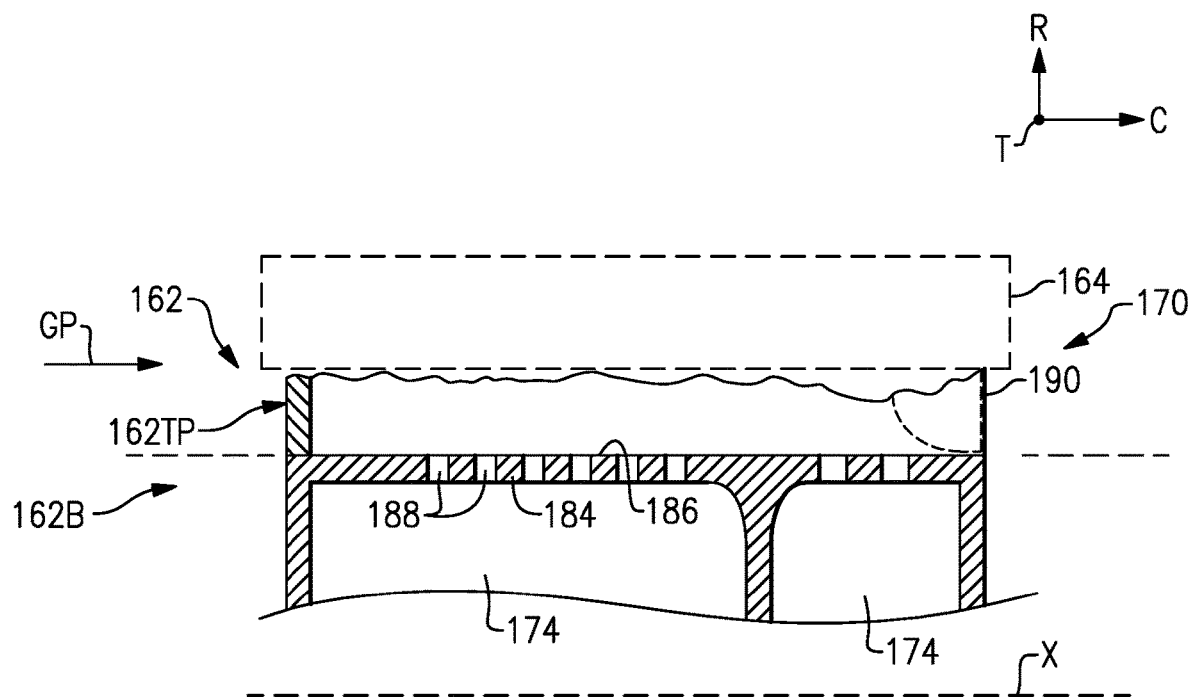
FIG. 7 illustrates the component of FIG. 5 in a worn condition.

As illustrated by FIG. 7, excessive mechanical rubbing interaction or contact between the tip 162C and the BOAS 164 may cause portions of the airfoil section 162B to erode or wear. Additionally, the airfoil tip configuration of the cooling arrangement 170 including purge partition 184 serves as an outer diameter (OD) tip endwall burn thru retention feature by preserving the functionality of the internal cooling circuit(s) 174. The cooling arrangement 170 allows for a sufficient amount of cooling flow F to continue to circulate within the internal cooling circuit(s) 174, even though portions of the airfoil section 162B may incur local thru wall oxidation, TMF thru-wall cracking, external tip wall erosion, and/or excessive wear to directly expose the purge cavity 186 to the gas path GP. The apertures 188 can be sized to maintain a predetermined pressure in the internal cooling circuit(s) 174 in the event that wear occurs through the floor 180 to directly expose the purge cavity 186 to the gas path GP. The purge partition 184 also serves as a cooling flow F retention feature, which can allow for a relatively significant amount of oxidation or cracking along the outer airfoil tip 162C while isolating the internal cooling circuit(s) 174 from degradation. Cooling flow F can continue to be communicated by the apertures 188 in the purge partition 184 to the purge cavity 186, even though the first region R1 is compromised. A risk of airfoil liberation during engine operation can be mitigated or otherwise reduced.

Figure 8:
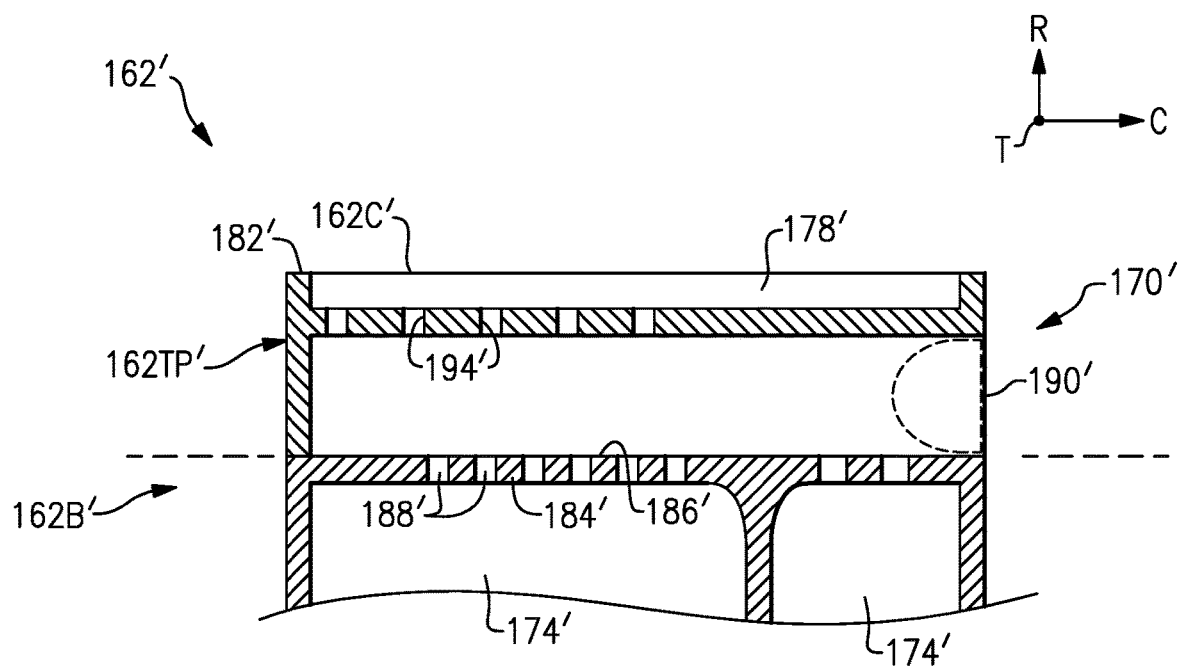
FIG. 8 illustrates the component of FIG. 7 in a repaired condition.

To repair the airfoil 162, material of the tip portion 162TP that extends outwardly from the purge partition 184 can be removed, including walls of the airfoil section 162B bounding the purge cavity 186. Referring to FIG. 8, a second tip portion 162TP' can be mechanically attached or otherwise secured to a remainder of the airfoil section 162 of FIG. 7 to define another instance of purge cavity 186' and another instance of tip pocket 178'. The tip portion 162TP' can be secured to the remainder of the airfoil section 162 utilizing various techniques, such as welding, and/or may be fabricated using powder bed laser sintering advanced additive manufacturing processes. A construction or geometry of the tip portions 162TP, 162TP' can be the same or can differ.

Figure 9:
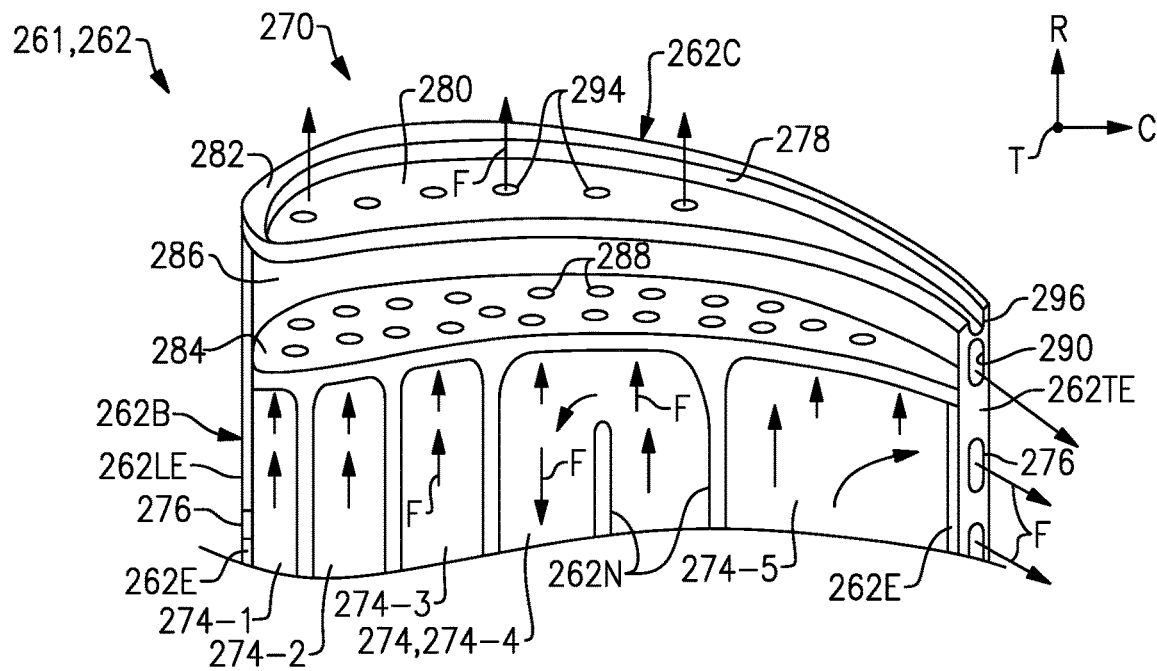
FIG. 9 illustrates a gas turbine engine component according to another example.

FIG. 9 illustrates a gas turbine engine component 261 defining a cooling arrangement 270 according to another example. In the illustrated example of FIG. 9, the gas turbine engine component 261 is a blade or airfoil 262. A purge slot 290 is defined along trailing edge 262TE. Airfoil section 262B defines a trench or slot 296 along trailing edge 262TE that opens to tip pocket 278. Opposed ends of rim wall feature 282 terminate at the slot 296. The airfoil section 262B defines a plurality of separate and distinct internal cooling circuits 274 (indicated at 274-1 to 274-5) radially inward of purge partition 284.

The components 161/261 disclosed herein can be made of metal, ceramic or composite materials, for example. Example metals include high temperature nickel and cobalt alloys. Various manufacturing techniques can be utilized to fabricate the purge partition 184/284 and apertures 188/288. In examples, the purge partition 184/284 is a separate and distinct component that is mechanically attached or otherwise secured to an interior of the airfoil 162/262. In other examples, the purge partition 184/284 is integrally formed with walls of the airfoil section 162B/262B. Example manufacturing techniques include additive manufacturing such as laser sintering power bed methods and investment casting utilizing a frangible core and lost wax. Another example manufacturing technique includes a Tomo-Lithographic Molding (TOMO) process, which combines lithography, molding and casting manufacturing methods to manufacture an integrated free form core.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
an airfoil section extending in a radial direction from a platform to a tip, and extending in a thickness direction between a pressure side and a suction side that meet together at both a leading edge and a trailing edge;
wherein the tip defines a tip pocket extending inwardly from the tip to a floor;
wherein the airfoil section includes a purge partition extending in a chordwise direction between the leading and trailing edges and extending in the thickness direction between the pressure and suction sides to divide the airfoil section into a first region and a second region, the first region defines at least one internal cooling circuit, the second region defines a purge cavity, the purge partition defines a first set of apertures that fluidly couple the at least one internal cooling circuit and the purge cavity, and the purge cavity extends along the floor between the leading and trailing edges; and
wherein the airfoil section defines a second set of apertures in the floor that fluidly couple the purge cavity and the tip pocket, the airfoil section defines a purge slot along the external wall that bounds the purge cavity, a total cross-sectional area of all of the second set of apertures is greater than a combined sum, the combined sum defined as a total cross-sectional area of all of the first set of apertures and a cross-sectional area of the purge slot, and the cross-sectional area of the purge slot is greater than the cross-sectional area of each of the first set of apertures.

2. The airfoil as recited in claim 1, wherein the at least one internal cooling circuit extends between the leading and trailing edges.

3. The airfoil as recited in claim 1, wherein the airfoil section extends in the radial direction between 0% span at the platform and 100% span at the tip, and the purge partition is defined at a radial position between 75% and 98% span.

4. The airfoil as recited in claim 3, wherein the airfoil section includes a rim wall that follows a perimeter of the airfoil section along the tip to bound the tip pocket.

5. The airfoil as recited in claim 4, wherein the airfoil is a turbine blade.

6. The airfoil as recited in claim 5, wherein the purge slot is defined adjacent to the trailing edge.

7. The airfoil as recited in claim 5, wherein a plurality of film cooling holes extend from the purge cavity.

8. The airfoil as recited in claim 5, wherein the cross-sectional area of each individual aperture of the first set of apertures taken along the purge cavity is less than 5% of the total cross-sectional area of the purge partition taken along the purge cavity.

9. The airfoil as recited in claim 1, wherein the purge slot is defined adjacent to the trailing edge.

10. The airfoil as recited in claim 1, wherein the airfoil section includes a plurality of ribs arranged to define a serpentine flow path in the at least one internal cooling circuit.

11. The airfoil as recited in claim 1, wherein the external wall of the airfoil section defines a plurality of film cooling holes extending from the purge cavity.

12. The airfoil as recited in claim 1, wherein the airfoil is a turbine blade.

13. A gas turbine engine comprising:
an array of blades rotatable about an engine axis, and an array of blade outer air seals (BOAS) arranged about the array of blades to bound a gas path; and
wherein at least one of the array of blades comprises:
an airfoil section extending in a radial direction from a platform to a tip, and extending in a thickness direction between a pressure side and a suction side that meet together at both a leading edge and a trailing edge;
a purge partition that radially divides the airfoil section, wherein a perimeter of the purge partition follows along external walls of the airfoil section;
wherein the tip defines a tip pocket extending radially inwardly from the tip to a floor;
wherein the airfoil section includes at least one internal cooling circuit and a purge cavity opposed to the at least one internal cooling circuit along the purge partition, with the purge partition bounded by the floor, and the purge partition defines a first set of apertures that fluidly couple the at least one internal cooling circuit and the purge partition; and
wherein the airfoil section defines a second set of apertures in the floor that fluidly couple the purge cavity and the tip pocket, the airfoil section defines a purge slot along one of the external walls that bounds the purge cavity, a total cross-sectional area of all of the second set of apertures is greater than a combined sum, the combined sum defined as a total cross-sectional area of all of the first set of apertures and a cross-sectional area of the purge slot, and the cross-sectional area of the purge slot is greater than the cross-sectional area of each of the first set of apertures.

14. The gas turbine engine component as recited in claim 13, wherein the purge partition extends in the thickness direction between the pressure side and the suction side.

15. The gas turbine engine component as recited in claim 13, wherein each of the second set of apertures defines a passage axis oriented to eject flow into a clearance gap defined in the radial direction between the tip and an adjacent one of the BOAS.

16. The gas turbine engine component as recited in claim 13, further comprising a turbine section driving a compressor section, wherein the airfoil is a turbine blade of the turbine section.

17. The gas turbine engine component as recited in claim 16, wherein each of the second set of apertures defines a passage axis oriented to eject flow into a clearance gap defined in the radial direction between the tip and an adjacent one of the BOAS.

18. The airfoil as recited in claim 17, wherein:
the cross-sectional area of each individual aperture of the first set of apertures taken along the purge cavity is less than 5% of the total cross-sectional area of the purge partition taken along the purge cavity; and
the purge slot is defined adjacent to the trailing edge.

19. A method of cooling a gas turbine engine component comprising:
communicating cooling flow to an internal cooling circuit of an airfoil section, wherein a purge partition radially divides the airfoil section, and the airfoil section defines a purge cavity opposed to the internal cooling circuit along the purge partition;
communicating the cooling flow through a first set of apertures in the purge partition and then to the purge cavity to purge debris in the internal cooling circuit;
communicating a portion of the cooling flow from the purge cavity to a second set of apertures defined along a floor of a tip pocket, the tip pocket extending inwardly from a tip of the airfoil section; and
ejecting the portion of the cooling flow from the second set of apertures to a clearance gap defined between the tip and a blade outer air seal (BOAS);
ejecting another portion of the cooling flow from the purge cavity through a purge slot to purge debris in the internal cooling circuit, wherein the purge slot is defined along an external wall that bounds the purge cavity; and
wherein a total cross-sectional area of all of the second set of apertures is greater than a combined sum, the combined sum defined as a total cross-sectional area of all of the first set of apertures and a cross-sectional area of the purge slot, and the cross-sectional area of the purge slot is greater than the cross-sectional area of each of the first set of apertures.

20. The method as recited in claim 19, wherein the gas turbine engine component is a turbine blade, and the airfoil section extends radially from a platform to the tip.

21. The method as recited in claim 19, wherein the tip pocket is bounded by a rim wall that follows a perimeter of the airfoil section along a tip portion to define the tip, and further comprising contacting the rim wall with the BOAS in response to rotating the airfoil section.

22. The method as recited in claim 21, further comprising removing the tip portion including walls of the airfoil section bounding the purge cavity, and attaching a second tip portion to a remainder of the airfoil section to define another instance of the purge cavity and another instance of the tip pocket.

* * * * *